United States Patent [19]

Chirdon

[11] Patent Number: 4,637,435

[45] Date of Patent: Jan. 20, 1987

[54] ANTISEAL ARRANGEMENT FOR HYDROPNEUMATIC PRESSURE TANKS

[75] Inventor: Charles P. Chirdon, Painesville, Ohio

[73] Assignee: Essef Corporation, Mentor, Ohio

[21] Appl. No.: 763,561

[22] Filed: Aug. 8, 1985

[51] Int. Cl.[4] .............................................. F16L 55/00

[52] U.S. Cl. ...................................................... 138/30

[58] Field of Search ................. 60/413; 92/86, 89, 90, 92/91; 138/30; 222/206, 209, 319, 373; 239/96; 417/395, 540

[56] References Cited

U.S. PATENT DOCUMENTS

| | | | |
|---|---|---|---|
| 745,876 | 12/1903 | Medley | 222/209 X |
| 2,347,379 | 4/1944 | Teeter | 138/30 |
| 2,401,792 | 6/1946 | Overbeke | 138/30 |
| 2,408,058 | 9/1946 | Gallagher | 222/209 X |
| 2,439,053 | 4/1948 | Moore | 138/30 X |
| 2,527,927 | 10/1950 | Grow, Jr. | 222/319 X |
| 3,212,602 | 10/1965 | Jones et al. | 138/30 X |
| 3,843,010 | 10/1974 | Morse et al. | 138/30 X |
| 3,893,485 | 7/1975 | Loukonen | 138/30 |
| 4,214,611 | 7/1980 | Takacs et al. | 138/30 |

FOREIGN PATENT DOCUMENTS

| | | | |
|---|---|---|---|
| 2251756 | 6/1975 | France | 138/30 |

*Primary Examiner*—Stephen Marcus
*Assistant Examiner*—Mark Thronson
*Attorney, Agent, or Firm*—Pearne, Gordon, Sessions, McCoy, Granger & Tilberry

[57] ABSTRACT

An accumulator tank for pressurizing and supplying liquid to a system comprises a pressure vessel having a wall defining a closed pressure chamber. The pressure vessel is provided with an internal flexible air cell which divides the pressure chamber into first and second variable volume compartments containing pressurized air and water, respectively. Perforated conduits are provided in the second compartment in fluid communication with a port, and extend between the wall of the pressure vessel and the flexible air cell. The perforated conduits provide fluid communication between the port and portions of the second compartment when the air cell seals against the wall to otherwise isolate those portions of the second compartment in fluid communication with the perforated conduits.

5 Claims, 3 Drawing Figures

ANTISEAL ARRANGEMENT FOR HYDROPNEUMATIC PRESSURE TANKS

BACKGROUND OF THE INVENTION

This invention relates to hydropneumatic accumulator tanks and, more particularly, to hydropneumatic accumulator tanks having a sealed pneumatic pressure cell therein in the form of a flexible bag or air cell.

The invention provides an arrangement which prevents the entrapment of liquid in an accumulator tank by the air cell where the orientation of the tank is such that the liquid is at a level lower than the outlet port so that the liquid may not be expressed from the bag with the aid of normal gravitational forces.

Typical prior art accumulator tanks comprise a rigid container (usually cylindrical or spherical) with a flexible and expansible bladder or air cell mounted therein as a pneumatic pressure cell. The air cell communicates with a one-way check valve projecting through the container for pneumatic pressurization. The air cell separates the interior of the container into the pneumatic pressure cell and an area for accumulating a liquid such as water. The portion of the container having the liquid therein is provided with an inletoutlet port which, in turn, communicates with a liquid service line.

In most prior art accumulators, particularly those intended to be used as a pressurization source in a home water system supplied by a well, the accumulator tank is mounted in a predetermined upright position with the inlet-outlet port at the bottom of the tank and with the pressurization valve for the air cell at the top of the tank. Thus, gravitational forces assist the flow of water out of the tank as the water is used in the home, since the inlet-outlet port is located at the lowest point on the tank. Pressure accumulator tanks, however, are finding increasing use in the field of home water treatment employing reverse osmosis techniques. Home water systems utilizing a reverse osmosis purification system at the sink tap employ a pressurized water storage or accumulator tank to eliminate the need for gravitational pressurization or additional pumps to provide the necessary pressures for reverse osmosis. Therefore, accumulator tanks having air cell-defined air pressure cells are provided in locations convenient to the reverse osmosis service tap in any convenient location normally in a cabinet or under the kitchen sink. The space available for the installation may necessitate an accumulator tank to be mounted horizontally, or even inverted from the normal installation position described above. In these situations, with the liquid inlet-outlet port positioned above portions of the interior of the container, the inflatable bag or air cell tends to trap a pocket or pockets of liquid within the container by engaging and sealing against the side wall of the accumulator tank.

A prior art attempt to overcome this problem is set forth in U.S. Pat. No. 2,893,433 to MacDuff. MacDuff describes a hydropneumatic energy storage device wherein hydraulic fluid is admitted to the top of a spherical container and air is admitted to the lower end of the container, with the air and liquid being separated by a flexible air cell. According to MacDuff, bosses are provided on the air cell so that the outer surface of the air cell intermediate the bosses is maintained in spaced relation with respect to the container so that any fluid trapped between the air cell and the cell at a point spaced away from the hydraulic opening can still flow between the bosses to the hydraulic opening. However, while the arrangement of MacDuff tends to overcome the problems involved, the provision of bosses on the air cell greatly adds to the manufacturing costs of the accumulator tank, since the air cell must be made from molded rather than calendered stock.

SUMMARY OF THE INVENTION

This invention provides an accumulator tank for pressurizing and supplying liquid to a system which eliminates the problem of liquid entrapment in the tank regardless of the mounting orientation of the tank.

According to this invention, the tank is provided with a fitting which includes an inlet-outlet port means for admitting liquid under pressure to the interior of the vessel and defining an inlet port for admitting pressurized air to an air cell within the interior of the vessel. Between the inner wall of the vessel and the air cell, there are provided one or more perforated conduits in the form of perforated tubing. Since the tubing extends between the wall of the pressure vessel and the flexible air cell, fluid communication is established between the outlet port and those portions of the liquid containing compartment when the air cell seals against the wall of the vessel to otherwise isolate those portions of the liquid compartment in fluid communication with portions of the conduit means.

While the illustrated embodiment of the invention contemplates a single port fitting for the introduction of air and liquid to the tank, it is obvious that separate fittings may be employed for such purposes.

DETAILED DESCRIPTION OF THE INVENTION

Figure 1:
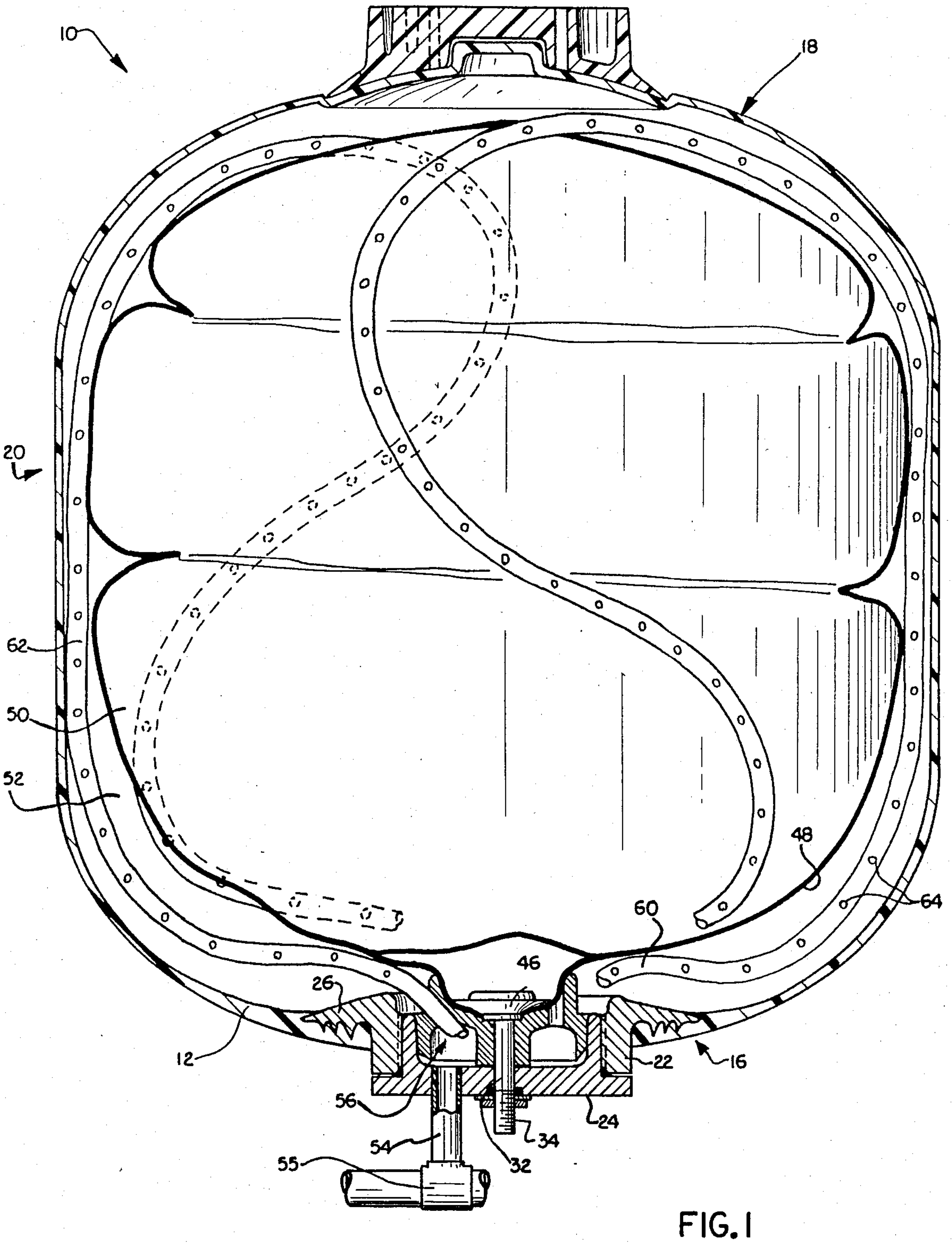
FIG. 1 is an elevational view, partly in section, of an accumulator tank according to the present invention.
Figure 1A:
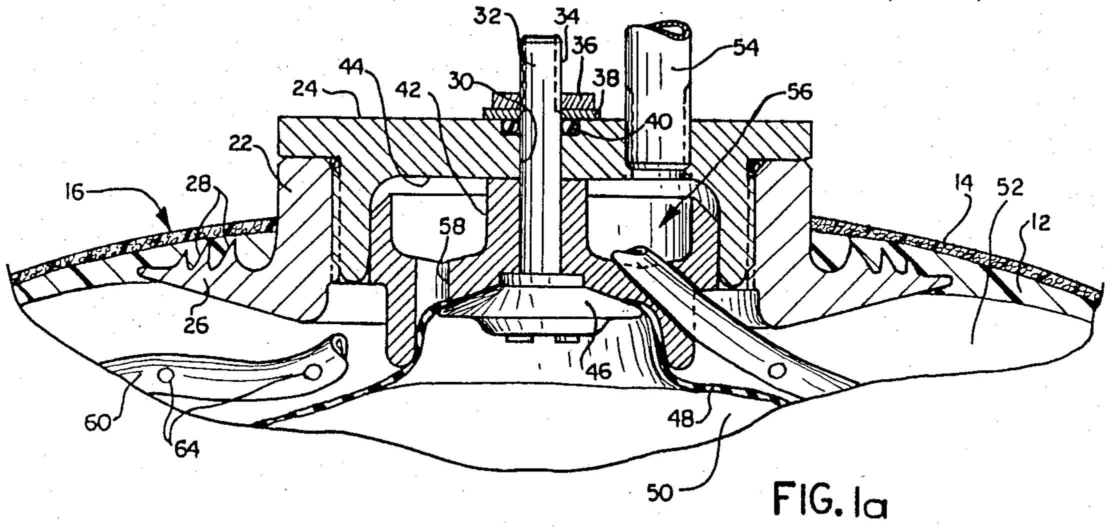
FIG. 1*a* is an enlarged detail view of a portion of the tank shown in FIG. 1.

Referring now to the drawings, there is illustrated an accumulator tank 10 formed by a rotationally cast or blow-molded thermoplastic liner 12 helically wound with thermosetting resin-impregnated glass fiber rovings 14 to resist axial and hoop stresses. The liner 12 may be formed by conventional techniques, and in the illustrated embodiment is in the shape of a cylinder having oblate, ellipsoidal end portions 16 and 18, and an intermediate cylindrical portion 20.

The end portion 16 has an internally threaded fitting 22 molded therein to provide access to the interior of the tank and to receive a closure cap 24 threaded therein. The fitting 22 has an annular flange 26 with concentric ridges 28 which form an interlock with the liner 12 as it is molded into the liner. The fitting 22 may be metal, for dimensional stability, or may be molded from a suitable plastic. The closure cap or cover 24 has an axial opening 30 therein which receives an air passage tube 32. The air passage tube is provided with threads 34 at one end and is retained relative to the cover 24 by a nut 36 and a washer 38, which trap an O-ring seal 40 in the cover 24.

The tube 32 carries a distributor fitting 42 which is slidably received in a recess 44 in the cover 24, and is retained therein by a air cell mounting flange 46 fixed to the outer end of the tube 32. A flexible air cell 48 is sealed to the flange 46 and extends into the interior of the accumulator tank 10 to separate the closed chamber defined by the tank into first and second variable volume compartments 50 and 52, respectively.

The flexible air cell 48 is charged with air through the tube 32, which has a connecting passage (not shown) through the flange 46. Liquid, such as water, is admitted to and exhausted from the second chamber 52 through a threaded tube 54 in the cap 24. The tube 54 may communicate with a T-fitting 55 in the home water service lines. The tube 54 is in fluid communication with a recess 56 in the fitting 42, and the recess communicates with the second chamber by way of passages 58. The fitting 42 together with the tube 32, the tube 54, and the recess 56 constitutes inlet/outlet port means for admitting liquid under pressure to the interior of the vessel and defining an air inlet port for admitting pressurized air to the interior of the vessel.

Figure 2:
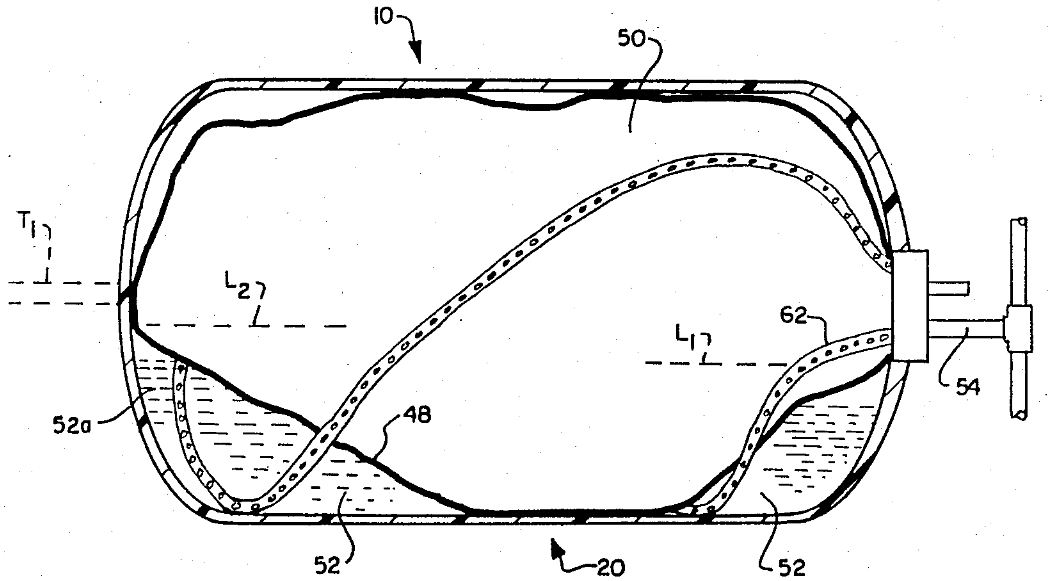
FIG. 2 is a partially schematic representation of an accumulator tank according to this invention in an installed orientation.

Upon pressurization of the air cell 48 by a source of pressurized air, liquid in the second chamber 52 is also pressurized. However, the air cell 48 may tend to seal the passageways 58 and, as may be noted in FIG. 2, a portion 52*a* of the second chamber 52 may be sealed from the passageways 58 by engagement of the air cell 48 with the side wall 20. Such conditions are likely to obtain if the accumulator tank is installed horizontally, as depicted in FIG. 2, and the liquid level of the tank is below the level of the passageway 58, as indicated by the dotted line $L_1$ in FIG. 2. Such a condition may also exist if the liquid inlet-outlet port is provided at the opposite end of the tank with respect to the air inlet, such as an inlet-outlet tube $T_1$, as indicated in dotted outline in FIG. 2, and the liquid level is at $L_2$, as is indicated in FIG. 2.

In order to eliminate the problem of blocking of the liquid in isolated pockets in the tank, perforated conduits 60 and 62 are provided. The conduits 60 and 62 are made of plastic tubing, and are provided with a multiplicity of apertures 64 along their lengths. The conduits 60 and 62 follow curved sinusoidal paths. The conduits 60 and 62 extend between the air cell 48 and the side wall of the accumulator tank to provide access to substantially all areas of the interior of the tank, which may comprise pockets of entrapped liquid, such as the area 52*a*, if the accumulator tank is installed in a variety of orientations. The conduits 60 and 62 communicate with the recess 56 through openings 64 in the fitting 42 so that water may enter and exit the tank through the apertures 58 and through the conduits 60 and 62.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. An accumulator tank for pressurizing and supplying liquid to a system, comprising a pressure vessel having a wall defining a closed pressure chamber, access fitting means in said pressure vessel defining an inlet/outlet port means for admitting liquid under pressure to the interior of the vessel and defining an air inlet port for admitting pressurized air to the interior of the vessel, flexible air cell means in fluid communication with said air inlet port and separating said closed chamber into first and second variable volume compartments respectively containing the air and the liquid, perforated conduit means in said second compartment in fluid communication with said port means and extending between the wall of the pressure vessel and said flexible air cell means, said conduit means comprising tubing following a sinusoidal path and having perforations adapted to provide fluid communication between said outlet port means and portions of said second compartment when said air cell means seals against said wall to otherwise isolate those portions of the second compartment but for the fluid communication provided by said perforations of said conduit means.

2. An accumulator tank according to claim 1, wherein said access fitting means comprises an internally threaded insert molded into one end of said wall.

3. An accumulator tank according to claim 1, wherein said pressure vessel is cylindrical and has oblate ellipsoidal end portions.

4. An accumulator tank according to claim 3, wherein said access fitting means comprises an internally threaded insert molded into one end of said wall.

5. An accumulator tank according to claim 1, wherein said inlet/outlet port means comprises an air passage tube, an access fitting, and a closure cap threaded into said access fitting, said closure cap having an opening therein which receives said air passage tube, said air passage tube being in fluid communication with said flexible air cell, a distributor fitting slidably mounted on said tube and having a recess therein, means providing fluid communication between said recess and said perforated conduit means, and means for providing fluid communication between said recess and service line fittings.

* * * * *